Oct. 7, 1969  E. O. ACKER  3,470,782
SLITTING MACHINE
Filed Jan. 3, 1966  2 Sheets-Sheet 1
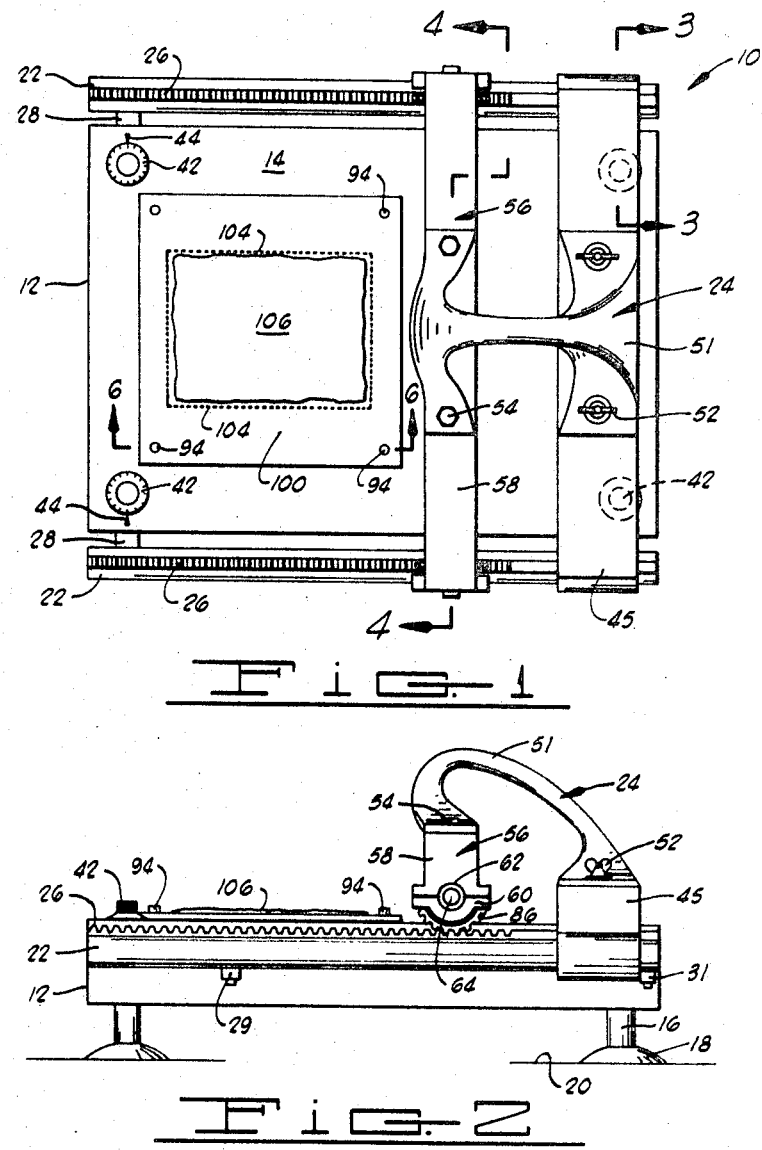
Fig. 1
Fig. 2
Fig. 7
INVENTOR.
Eric O. Acker
BY 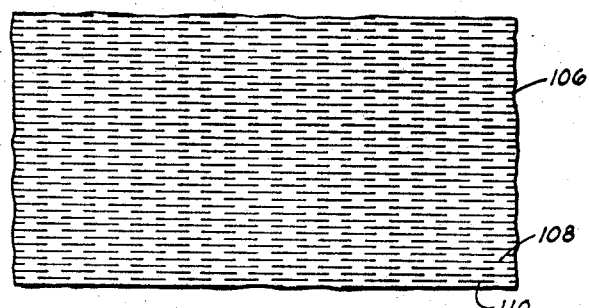
ATTORNEYS

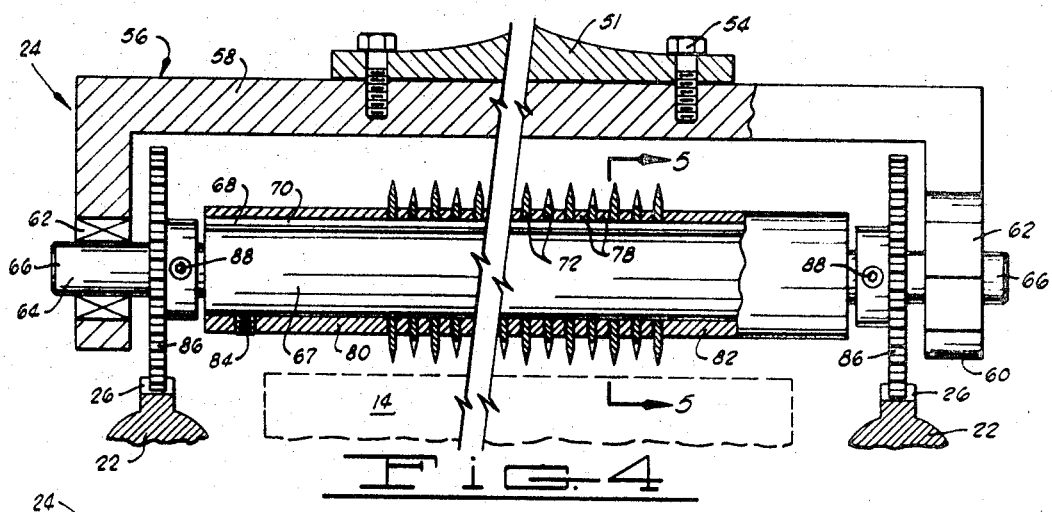

United States Patent Office 3,470,782
Patented Oct. 7, 1969

3,470,782
SLITTING MACHINE
Eric O. Acker, 4436 NW. 59th St.,
Oklahoma City, Okla. 73112
Filed Jan. 3, 1966, Ser. No. 518,140
Int. Cl. B23d 19/06; B26d 1/14
U.S. Cl. 83—451
14 Claims

ABSTRACT OF THE DISCLOSURE

Apparatus for preparing skin or such thin material for employ in expanded disposition, which apparatus employs a flat base member for holding the skin or such material in position while a movable cutting assembly is passed thereacross to place a plurality of rows or regularly spaced slits in the material. The cutting assembly includes a rotatable cutter bar bearing a plurality of parallel, toothed cutter wheels with the toothed portions of adjacent ones of a cutter wheel being alternately staggered to score a desired slit pattern in the finished expandable material.

This invention relates generally to improved apparatus for slitting relatively thin material. More particularly, but not by way of limitation, this invention relates to an improved apparatus for forming a plurality of rows of relatively short slits in relatively thin material used in performing plastic surgery.

In the past, the most frequently used method for performing a relatively large skin graft was to remove sufficient skin to perform the graft, cut the removed skin into relatively small squares (for example, one millimeter square), place the squares of skin onto the area where the graft is to be formed, by hand, one square at a time. In a new skin grafting technique, a plurality of rows alternating short slits are formed in the removed skin. The skin is then grasped on the sides and pulled in a direction perpendicular to the length of the slits to expand the skin to a size aproximately twice that of the original skin area. The expanded skin is then split into two portions, one being placed on the area on which the graft is to be formed and the other returned to the place where the skin was removed. This new technique provides a must faster healing process and due to the openings provided by the slits when the skin is expanded, acts as a deterent to the formation of infection in the skin graft.

A machine has been developed for performing the slitting operation. In the machine developed, the skin is placed between layers of plastic or similar material and then passed through rollers containing a plurality of rows of cutting knives. The skin and plastic moving through the machine is compressed as it is fed between the rolls thereby mutilating the skin and forcing some of the liquids contained therein from the skin. While the machine provides relatively satisfactory results, it is believed that the healing process can be greatly improved if the skin is not mutilated and if the liquids are not driven therefrom.

Therefore, this invention contemplates improved apparatus for forming a plurality of rows of relatively short slits in a relaively thin material, such as skin, the improved apparatus comprising: a base member having a generally planar surface for holding the material to be slit; and, a slitting assembly movably positioned on the base, the slitting assembly including carrier means slidingly connected with the base and cutting means journaled in the carrier means. The cutting means includes a plurality of toothed cutter members arranged to engage the material. Driving means located on the apparatus is provided to rotate the cutting means at a speed proportional to the speed of movement of the slitting assembly relative to the base member, whereby the teeth on the cutter members engage the material and form a plurality of rows of short slits therein without mutilating or compressing the material in which the slits are formed.

One object of the invention is to provide an improved apparatus for forming relatively short slits in relatively thin material.

Another object of the inventon is to provide an improved apparatus for forming a plurality of rows of relatively short slits in a relatively thin material that does not mutilate or compress the material being slit.

An additional object of the invention is to provide an improved apparatus for forming a plurality of alternating rows of relatively short slits in relatively thin material that includes means for varying the length and/or spacing of the slits formed therein.

A still further object of the invention is to provide an improved apparatus for forming a plurality of alternating rows of relatively short slits in a relatively thin material that includes a plurality of cutter members positively driven wherein the identical slits can be recut in greater length if desired.

The foregoing and additional objects and advantages of the invention will become more apparent as the following detailed description is read in conjunction with the accompanying drawings wherein like reference characters denote like parts in all views and wherein:

FIG. 1 is a plan view of slitting apparatus constructed in accordance with the invention;

FIG. 2 is a side elevation view of the slitting apparatus of FIG. 1;

FIG. 3 is an enlarged, fragmentary cross-sectional view taken substantially along the line 3—3 of FIG. 1;

FIG. 4 is an enlarged fragmentary cross-sectional view taken substantially along the line 4—4 of FIG. 1;

FIG. 5 is an enlarged cross-sectional view taken substantially along the line 5—5 of FIG. 4 illustrating the construction and arrangement of the cutter members utilized in the slitting machine of FIG. 1;

FIG. 6 is a cross-sectional view taken substantally along the line 6—6 of FIG. 1; and, FIG. 7 is a view of a piece of material slit by the slitting apparatus of FIG. 1.

Referring to the drawings and to FIG. 1 in particular, shown therein and generally designated by the reference character 10 is a slitting machine constructed in accordance with the invention. The slitting machine 10 includes a base member 12 that is generally rectangular in configuration and has an upper planar surface 14 thereon.

As shown most clearly in FIG. 2, the base 12 is supported by four short legs 16 having suction cups 18 thereon. The suction cups 18 are arranged to engage a surface 20 upon which the slitting machine 10 rests to prevent movement of the slitting machine 10 during operation.

The slitting machine 10, as shown most clearly in FIG. 1, also includes a pair of elongated guide members 22 arranged in spaced parallel relationship on either side of the base member 12 and connected thereto as will be described more fully hereinafter. A slitting assembly 24 is slidingly mounted on the guide members 22 as will be described more fully hereinafter.

As shown in FIG. 3, the elongated guide members 22 are generally circular in cross section and have a rack gear portion 26 formed on or attached to the upper side thereof. Lug portions 28 extend inwardly from each end of the elongated guide members 22 toward the base member 12.

The lug portions 28 extend through slots 30 (see FIG. 3) formed in the base member 12. The slots 30 are formed substantially the same width as the lugs 28 to prevent relative longitudinal movement between the elongated guide members 22 and the base member 12, but to permit relative vertical movement therebetween.

Removable stops 29 and 31 (see FIG. 2) are located on the lower side of the guide members 22. The stops 29 and 31 are provided to limit the travel of the slitting assembly 24.

As clearly shown in FIG. 3, the other end of each of the lugs 28 is provided with a threaded aperture 32 that receives a partially threaded shaft 34. The partially threaded shaft 34 is positioned vertically in the base member 12 and is journaled therein by a pair of bearings 36 and 38 that are mounted in the base member 12. An exterior flange 40 located on the shaft 34 engages the lower end of the bearing 38 to prevent upward movement of the shaft 34 relative to the base member 12.

A graduated knob 42 is connected with the upper end of the shaft 34 above the planar surface 14 on the base member 12 to permit rotation of the shaft 34 and to prevent the downward movement of the shaft 34 relative to the base member 12. As will be clearly apparent in FIG. 3, rotation of the shaft 34 through its threaded engagement with the lug 28 moves the guide members 22 in a vertical direction relative to the base member 12. As may be seen in FIG. 1, an index 44 is provided for each of the graduated knobs 42 so that each end of each of the elongated guide members 22 can be selectively positioned and maintained in a spaced parallel alignment.

The slitting assembly 24 includes a carrier member 45 that extends entirely across the base member 12 as illustrated in FIG. 1. The outermost ends of the carrier member 24 extend downwardly and the terminal ends thereof are provided with a bore 46 (see FIG. 3) that is complementary in shape and sized to slidingly engage the elongated guide members 22. A vertically extending slot 48 is formed in the carrier member 45 to provide clearance for the rack gears 26 located on the guide members 22. A horizontally extending slot 50 is provided in the interior side wall of the carrier member 45 to provide clearance for the lug portions 28.

A handle 51 is releasably connected to the carrier member 45 by a pair of thumb screws 52 that permit quick and easy removal of the handle 51 from the carrier member 45 for purposes that will be more apparent hereinafter. The opposite end of the handle 51 is connected by a plurality of threaded fasteners 54 with a cutting assembly 56.

The cutting assembly 56 includes a shaft support member 58 that extends across the base member 12, as illustrated in FIG. 1, in parallel spaced relation with the carrier member 45. As may be clearly seen in FIG. 4, each end of the shaft support member 58 extends downwardly. As shown in the right hand portion of FIG. 4 and in FIG. 2, the lowermost portion of each of the down-turned ends of the support member 58 are provided with a cap 60 that is connected with the support member 58 by a pair of threaded fasteners (not shown). The caps 60 are provided to permit the removal of the bearings 62 and a shaft 64 that is journaled in the bearings 62.

The shaft 64 extends across the base member 12 and is disposed in spaced, parallel relationship thereto. The shaft 64 includes, at each end, a portion 66 of reduced diameter that extends through the bearings 62. A medial portion 67 of the shaft 64 is provided with a key slot 68 that is sized to receive an elongated key 70.

As shown in FIG. 4, the key 70 extends the full length of the medial portion 67 of the shaft 64. The cross-sectional configuration of the key 70 and the key slot 68 may be seen more clearly in FIG. 5.

Mounted on the medial portion 67 of the shaft 64 are a plurality of cutting blades 72. The cutting blades 72 are connected for rotation with the shaft 64 by the key 70 that extends through one of two key slots 74 and 76 (see FIG. 5) formed in each of the cutting blades 72.

The cutting blades 72 are held in spaced relation by a plurality of spacers 78 that are also disposed on the medial portion 67 of the shaft 64. To position the blades 72 and the spacers 78 lengthwise on the shaft 64, set collars 80 and 82 are connected to the shaft 64 by set screws 84 (only one is shown in FIG. 4).

Also mounted on the shaft 64, but located on the small ends 66 thereof are a pair of spur gears 86. The spur gears mesh, either the spur gears 86 or the rack gear 88 and are therefore, rotatable with the shaft 64. As can be seen clearly in FIGS. 2 and 4, the spur gears 86 are in mesh with the rack gears 26 on the elongated guide members 22. To reduce the noise usually present when gears mesh, either the spur gears 86 or the rack gear 26 can be constructed from a material such as nylon or Teflon. Constructing one of the gears from a synthetic material also eliminates the necessity for lubrication between the mating gears.

The cross-sectional view of FIG. 5 illustrates clearly the structure and arrangement of the cutter blades 72. As shown therein, each cutter blade 72 includes an aperture 90 that extends therethrough and is sized to receive the medial portion 67 of the shaft 64. Each cutter blade 72 is provided with a plurality of teeth 92 that are honed to a very sharp cutting edge.

Also, each cutter blade 72 is provided with a pair of key slots 74 and 76 as previously mentioned. The key slots 74 and 76 are angularly offset so that the teeth 92 on alternating cutter blades 72 are arranged as illustrated in FIG. 5, that is, alternate cutter blades 72 have the key slot 76 or the key slot 74 engaging the key 70.

Four relatively short guide posts 94 extend upwardly from the planar surface 14 of the base member 12 as may be seen in FIG. 1. As illustrated in FIG. 6, the guide posts 94 are sufficiently long to extend through a backing member 96. The member 96 is preferably constructed from a relatively soft material, such as cork. The member 96 is provided with four apertures 98 that are arranged to coincide with the guide posts 94 to position the backing member 96 on the planar surface 14 of the base member 12.

A relatively thin plastic sheet 100 is also provided with four apertures 102 that are coincident with the apertures 98 to position the plastic sheet 100 on the backing member 96 and on the planar surface 14. As shown in FIG. 1, the plastic sheet is provided with a plurality of perforations 104 arranged to form a rectangle slightly larger than the material to be cut. The plastic sheet 100 is preferably provided with a pressure-sensitive adhesive layer on the upper surface thereof.

The adhesive layer on the plastic sheet is provided so that a relatively thin portion of skin or other material 106 will adhere thereto without the use of external clamps or the like. A uniform distribution of the adhesive layer on the plastic sheet insures that the skin 106 will be firmly secured to the plastic sheet 100 and will not move relative to the base member 12 during the formation of the slits in the skin 106.

The enlarged view of FIG. 7 illustrates the appearance of the skin 106 after the slitting operation has been performed. As illustrated therein, the teeth 92 on the cutter members 72 have formed a plurality of rows of relatively short and alternating slits 108 and 110. The length of the slits 108 and 110 is determined by the depth of penetration of the teeth 92 into the skin 106 and the distance between the slits 108 and 110 is determined by the thickness of the spacers 78.

For normal use in skin grafting operations, it is preferred that each of the cutter blades 72 have a thickness of approximately $10/1000$ of an inch and that each of the spacer members 78 have a thickness of 35 to 40/1000 of an inch, thus, it can be seen that the strands of skin 106, that is, the material between the slits 108 and 110 will be approximately 3½ to 4 times the thickness of the blades 72 in the normal skin grafting operation.

Operation

To use the slitting machine 10 in a skin grafting operation, the skin 106 is removed and attached to the plastic sheet 100 within the area defined by the perforations 104. It is important to the speed of the grafting process that the epidermis of the removed skin 106 be adhered to the plastic sheet 100. A backing member 96 is placed on the base member 12 over the guide posts 94 and in engagement with the planar surface 14. The plastic sheet 100 with the attached skin 106 is then placed over the guide posts in engagement with the backing member 96.

The cutter blades 72 are adjusted to the proper height relative to the planar surface 14 to form the slits 108 and 110 in the length desired. The adjustment is accomplished by rotating the graduated knobs 42 until the desired graduation thereon is aligned with the indexes 44. Rotation of the knobs 42 raises or lowers the guide members 22 and the slitting assembly 24 by virtue of the engagement between the carrier member 45 and the guide members 22 and between the spur gears 86 and the rack gears 26 located on each of the guide members 22.

After the adjustment has been made to the desired depth of penetration of the teeth 92, the handle 51 is grasped and the slitting assembly 24 moved relative to the base member 12 until the cutter blades 72 have cleared the opposite end of the skin 106 or until the slitting assembly 24 engages the stop 29. It should be pointed out that the action of the cutter blades 72 on the skin 106 is a pure shearing operation, that is, since the cutter blades 72 are rotated by the engagement between the spur gears 86 and the rack gears 26, no force other than the shearing action is exerted on the skin 106. Therefore, the skin 106 is not distorted, compressed or deformed during the slitting operation.

If the slits 108 and 110 are not sufficiently long, the guide members 22 may be readjusted in their vertical height by rotating the knobs 42. The cutter blades 72 are positively driven by the engagement of spur gears 86 with the rack gears 26, therefore, the slitting assembly 24 is drawn over the skin 106 a second time to elongate the slits 108 and 110 and the cutter teeth 92 will re-enter the same slits previously formed.

After the slits 108 and 110 have been formed to the desired length in the skin 106, the plastic sheet 100 containing the skin 106, that is, the portion of the sheet 100 lying within the perforations 104 is removed by either tearing the plastic sheet 100 along the perforations 104 or by making a quick cut therealong to completely free the skin 106 and the attached portion of plastic sheet 100. It should also be pointed out that the plastic sheet 100 is engaged by the cutter blades 72 and is therefore formed with slits similar to those formed in the skin 106.

After removing the skin 106 and the plastic sheet 100 from the slitting machine 10, the edges of the plastic sheet 100 adjacent the skin 106 are grasped either in the hands or by suitable clamps and a force is exerted thereon perpendicular to the length of the slits 108 and 110 to open the slits 108 and 110. That is, the skin 106 is expanded to approximately twice its unslit size.

If desired, the skin 106 and the plastic sheet 100 can then be cut in half and one half placed on the area wherein the graft is to be made. The other half may be returned to the area wherein the skin was removed and thus enhance the healing of both the area from which the skin was removed and the area on which the skin graft is to be made. The plastic sheet 100 can be left on the skin 106 if desired.

Since the only portion of the slitting machine 10 to come in contact with the skin 106 during the slitting operation is the cutter blades 72, the thumb screws 52 can be loosened and the handle 51 and attached cutting assembly 56 lifted from the slitting machine 10. After removal therefrom, the handle 51 and the cutting assembly 56 is placed in an autoclave or other suitable device for sterilization prior to the next slitting operation. After each operation, the base member 96 and the remaining portion of the plastic sheet 100 is removed from the base member 12 and discarded.

As is readily apparent from viewing the various figures of the drawing, the caps 60 can be removed from the cutting assembly 56 to permit the removal of the shaft 64 therefrom. Thus, it is possible to quickly and easily replace worn cutter blades 72 or to vary their spacing as previously mentioned by substituting different lengths of spacer members 78.

From the foregoing detailed description of the slitting machine 10, it can be appreciated that the device quickly and efficiently performs the desired slitting operation without mutilation of the skin and without compressing the skin in any sense thereby retaining the natural liquids in the skin. Also, the device can be quickly, easily and economically manufactured and requires little or no maintenance during its service life, with the exception of periodically replacing the cutter blades 72.

Having described but a single embodiment of the invention, it will be understood that it is presented by way of example only and that many changes and modifications can be made thereto without departing from the spirit of the invention or from the scope of the annexed claims.

What I claim is:

1. Apparatus for forming a plurality of rows of relatively short slits in a relatively thin material, said apparatus comprising:
    a base member having a generally planar surface for holding the material to be slit;
    a slitting assembly movably positioned on said base member, said slitting assembly including
        carrier means slidingly connected with said base member, and
        cutting means journaled in said carrier means and including a plurality of toothed, generally round cutter members arranged in parallel and each being disposed to engage the material at an angularly displaced position relative to any adjacent cutting member;
        driving means on said apparatus for rotating said cutting means at a speed proportional to the movement of said slitting assembly relative to said base member whereby said cutting members engage said material and form a plurality of rows of short slits therein; and
        adjustment means for positioning said carrier means at a preset level with respect to said base member such that the toothed cutter members are positioned relative to the thin material to vary the length of individual slits made by each of the toothed cutter members.

2. The apparatus of claim 1 and also including:
    a guide member located on said base member in sliding engagement with said carrier means.

3. The apparatus of claim 2 wherein said driving means includes:
    a rack gear portion on said guide member; and,
    a pinion gear mounted on and rotatable with said cutting means in mesh with said rack gear portion.

4. The apparatus of claim 3 wherein said cutting means includes:
    a shaft journaled in said carrier means; and,
    connecting means joining said toothed cutter members to said shaft whereby the teeth on adjacent ones of said cutter members are disposed in an alternating arrangement.

5. The apparatus of claim 4 wherein said connecting means includes:

a pair of angularly-spaced key slots in each said cutter member;

a key slot in said shaft; and, an elongated key disposed in the key slot in said shaft and in one key slot i neach of said cutter members, thereby connecting said cutter members to said shaft with the teeth on said cutter members being disposed in an alternating arrangement.

6. The apparatus of claim 5 wherein said carrier means includes:

a shaft support member journalling said shaft and cutter members;

a carrier support member slidingly engaging said guide member; and, a handle member connecting said shaft support member with said carrier support member.

7. The apparatus of claim 6 wherein said adjustment means comprises:

adjustable means operably connecting said guide member and base member for selectively positioning said guide member relative to said base member, whereby the teeth on said cutter members are selectively positioned relative to said planar surface and said material to vary the length of said slits.

8. The apparatus of claim 1 wherein said carrier means includes:

a cutter means support member journalling said cutter means;

a carrier support member slidingly engaging said base member; and, a handle member connecting said cutter means support member with said carrier support member.

9. The apparatus of claim 8 and also including a pair of guide members located on said base member in spaced, parallel relationship and in sliding engagement with said carrier support member.

10. The apparatus of claim 9 wherein said adjustment means comprises:

adjustable means connecting said guide members with said base members, whereby said guide members can be selectively positioned relative to said base member to position the teeth on said cutter member relative to said planar surface and the material thereby varying the length of said slits.

11. The apparatus of claim 10 wherein said adjustable means includes:

a pair of spaced lug portions connected with each of said guide members, each of said lug portions having a threaded aperture extending therethrough; and, a threaded shaft disposed in the threaded aperture in each of said lugs, each threaded shaft being journaled in said base member, whereby rotation of said shafts moves said guide members relative to said base member.

12. The apparatus of claim 11 wherein said driving means includes:

a rack gear portion on each of said guide members; and, a pair of pinion gears mounted on and rotatable with said cutting means, a respective one of said pinion gears being in mesh with one of said rack gear portions to rotate said cutting means when said carrier means is moved relative to said base member.

13. The apparatus of claim 12 and also including:

a plurality of guide posts extending perpendicularly to said planar surface;

a relatively soft backing sheet arranged to be disposed on said planar surface and having an aperture therein for receiving each of said guide posts; and, a material receiving sheet having an adhesive layer thereon adapted to adhere to the material to be slit, said sheet having an aperture therein for receiving each of said guide posts.

14. The apparatus of claim 13 wherein said material receiving sheet also has a plurality of perforations arranged in a rectangle, said rectangle being sized to encompass the material being slit.

References Cited

UNITED STATES PATENTS

| | | | |
|---|---|---|---|
| 737,194 | 8/1903 | Armstrong | 83—664 |
| 3,152,501 | 10/1964 | Nassar | 83—678 X |
| 2,535,195 | 12/1950 | Colucci et al. | 144—136 |

FOREIGN PATENTS

| | | |
|---|---|---|
| 20,619 | 1/1883 | Germany. |

ANDREW R. JUHASZ, Primary Examiner

U.S. Cl. X.R.

83—477, 489, 508, 678, 925

PO-1050
(5/69)

UNITED STATES PATENT OFFICE
CERTIFICATE OF CORRECTION

Patent No. 3,470,782  Dated October 7, 1969

Inventor(s) Eric O. Acker

It is certified that error appears in the above-identified patent and that said Letters Patent are hereby corrected as shown below:

In Column 1, line 63 "relaively" should be --relatively--.

In Column 4, line 14 "gears mesh, either the spur gears 86 or the rack gear" should be --gears 86 are connected to the shaft 64 by set screws--.

In Column 7, line 5 "i neach" should be --in each--.

SIGNED AND
SEALED
JAN 27 1970

(SEAL)
Attest:

Edward M. Fletcher, Jr.
Attesting Officer

WILLIAM E. SCHUYLER, JR.
Commissioner of Patents